UNITED STATES PATENT OFFICE.

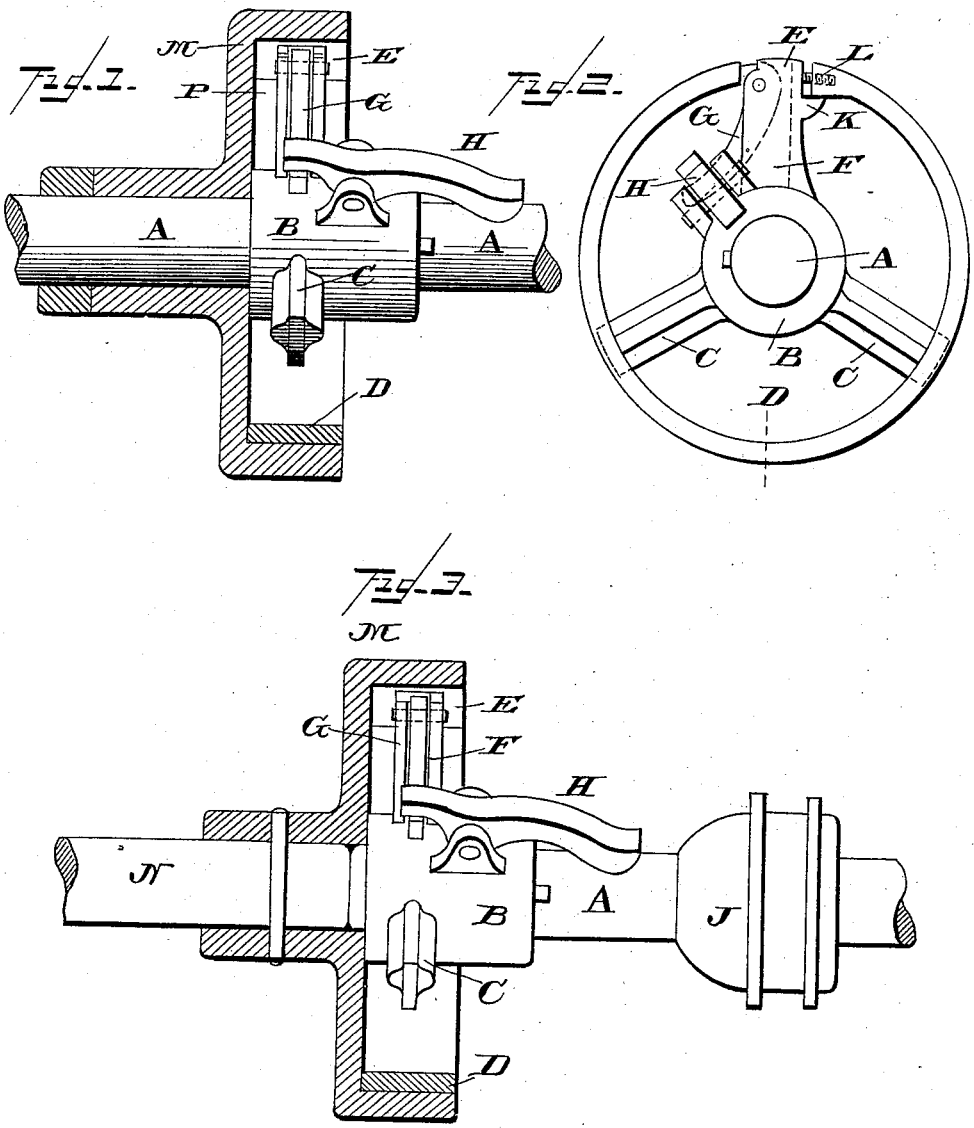

WILLIS C. JONES AND WINFIELD S. ROGERS, OF CINCINNATI, OHIO.

FRICTION-CLUTCH.

SPECIFICATION forming part of Letters Patent No. 397,859, dated February 12, 1889.

Application filed April 30, 1888. Serial No. 272,385. (No model.)

*To all whom it may concern:*

Be it known that we, WILLIS C. JONES and WINFIELD S. ROGERS, of Cincinnati, Hamilton county, Ohio, have invented certain new and useful Improvements in Friction-Clutches, of which the following is a specification.

This invention pertains to friction-clutches designed for use in connection with two pieces of mechanism arranged to revolve upon the same axis to serve as a means for locking the two parts together at will.

Our improvements will be readily understood from the following description, taken in connection with the accompanying drawings, in which—

Figure 1 is a side elevation of our improved friction-clutch, with the rim-piece shown in vertical diametrical section, this view illustrating the rim-piece as a loose pulley free to revolve upon the shaft to which the clutch is fast, the object of the clutch being to lock the rim-piece to the shaft when desirable; Fig. 2, a face elevation of the clutching parts without the rim-piece; and Fig. 3, a view similar to Fig. 1, but illustrating the rim-piece as being fast upon a shaft free to revolve independent of the shaft to which the clutch is attached, whereby a friction-coupling is provided for locking the two shafts together at will.

In the drawings, A indicates the shaft to which the clutching structure is fixed; B, a spider-hub fast thereto; C, a pair of spider-arms projecting from said hub and terminating in tenons; D, a friction-ring disposed concentrically to the hub and having mortises freely engaging the tenons of the arms C; E, a gap in the friction-ring; F, a third spider-arm projecting from the hub outwardly into the gap of the friction-ring, one end of the friction-ring engaging one side of this arm at L; G, a lever pivoted to the spider-arm F upon a pivot located near the outer end of that arm with its axis parallel to the shaft, the short end of this lever engaging the free end or gap wall of the friction-ring, while the long end of the lever projects inwardly to near the hub; H, a lever pivoted to the hub B with its pivot-axis at right angles to the shaft, the inner short end of this lever projecting over the inner long end of the lever G, while the outer longer end of the lever H projects outwardly beyond the hub and near the shaft; J, the usual cone fitted to slide upon the shaft; K, a lug projecting from the spider-arm F upon that side of the arm which is engaged by the friction-ring, and serving to support the friction-ring at one side of the gap; L, a screw screwed into one wall of the gap of the friction-ring and projecting therefrom into abutting engagement with the spider-arm F, this screw, if employed, serving as a means by which the fixed end or gap wall of the friction-ring may be adjusted to and from the spider-arm F; and M, the rim-piece of the clutch encircling and fitting the outside of the friction-ring, this rim-piece having a hub fitting and free to revolve upon the shaft A, to which the spider is attached, this shaft projecting to the left beyond the spider-hub, while in Fig. 3 the shaft A terminates just beyond the spider-hub. A longer independent shaft, N, continues therefrom in the same axis, the rim-piece being fixed to this shaft N.

It will be understood that Fig. 1 illustrates the device as a means for locking a loose pulley to its shaft, and in this case representing a loose pulley. The normal diameter of the friction-ring is such that the rim-piece may revolve freely around it without serious frictional contact. If the cone be moved under the outer end of the lever H, the lever will in an obvious manner pry the gap of the friction-ring more open, and thus expand the friction-ring to tightly fill the rim-piece and lock the rim-piece to the shaft. Sliding the cone to the right permits the friction-ring to contract and free the loose pulley. The screw L is not at all essential; but its use is to be recommended, as it serves as a means by which the normal opening of the gap may be increased as the periphery of the friction-ring becomes worn away by use.

Fig. 3, it will be understood, illustrates the clutch as used for a friction-coupling for coupling the two shafts A and N together at will, the operation of the clutching parts being precisely as before.

We claim as our invention—

1. In a friction-clutch, the combination, substantially as set forth, of a spider-hub provided with arms, a friction-ring carried by said arms and having a gap or opening at one of said spider-arms, one wall of said gap abutting against one side of such arm, a lever pivoted to the spider-arm which is located at the gap of the friction-ring and engaging with its outer end the free wall of the gap of the friction-ring, while the other and longer end of the lever projects inwardly near the spider-hub, a lever pivoted to the spider-hub and engaging its shorter end over the longer end of said first-mentioned lever, while the longer end of said hub-spider projects outwardly beyond the spider-hub and is adapted to be engaged by a sliding cone, and a rim-piece encircling and fitting the friction-ring, and having a hub adapted to engage a shaft whose axis is coincident with the axis of the spider-hub.

2. In a friction-clutch, the combination, substantially as set forth, of spider-hub B, having arms C terminating in tenons, and having arm F, friction-ring D, provided with mortises engaging said tenons and having a gap, one wall of which engages the arm F, lever G, pivoted to the arm F and engaging the free wall of the gap of the friction-ring, lever H, pivoted to the spider-hub and engaging with one end the lever G, and having its other end projecting outwardly beyond the hub and adapted to be engaged by a cone, a rim-piece, M, encircling and fitting the friction-ring, and having a hub with its axis coincident with the axis of the spider-hub.

WILLIS C. JONES.
    WINFIELD S. ROGERS.

Witnesses:
 HARRY S. WORTHMAN,
 S. B. DEAL.